(No Model.)

J. A. BICKFORD.
VEHICLE BRAKE.

No. 510,766. Patented Dec. 12, 1893.

Witnesses:

Inventor,
James A. Bickford
by Frank L. Dyer
his Attorney

UNITED STATES PATENT OFFICE.

JAMES A. BICKFORD, OF LOCK HAVEN, PENNSYLVANIA.

VEHICLE-BRAKE.

SPECIFICATION forming part of Letters Patent No. 510,766, dated December 12, 1893.

Application filed April 3, 1893. Serial No. 468,842. (No model.)

*To all whom it may concern:*

Be it known that I, JAMES A. BICKFORD, a citizen of the United States, residing at Lock Haven, in the county of Clinton and State of Pennsylvania, have invented certain new and useful Improvements in Vehicle-Brakes; and I do hereby declare the following to be a full, clear, and exact description of the invention, which will enable others skilled in the art to which it appertains to make and use the same.

My invention relates to that class of vehicle brakes adapted to clamp or grip the rim or felly of the wheel and my said invention is especially adapted to be used as a brake for velocipedes, bicycles, tricycles, and other vehicles having rubber tires.

The usual form of brakes now used on bicycles and similar vehicles is what is known as a spoon brake, wherein the brake shoe is concave and is adapted to fit closely over the tire of the wheel so that when it is pressed close thereon the friction between the two is intended to stop or retard the motion of the vehicle.

This form of brake has many disadvantages, which become particularly noticeable when used in connection with bicycles or tricycles, equipped with pneumatic tires, inasmuch as such tires are so soft that it is impossible to grip a spoon brake tightly thereon, and the wear between the two is so excessive that such tires have to be constantly repaired. In addition to this, the spoon brake is not effective if the tire is at all moist or slippery, and in all cases the friction of the brake shoe against the tire causes a great deal of wear and damage to the tire.

My invention consists generally in providing a pair of gripping levers parallel to each other and pivoted to the frame of the bicycle or to any rigid point thereon, and adapted to be actuated so as to clamp or grip the inner surface of the rim or felly of one or more of the wheels. The exact arrangement of the details of the brake will be described hereinafter.

In order to better understand the nature of the invention attention is directed to the accompanying drawings, in which—

Figure 1:
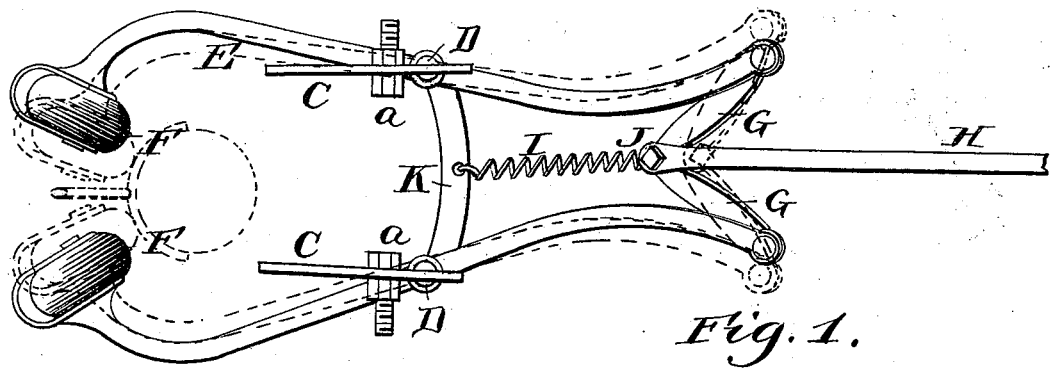
Figure 2:
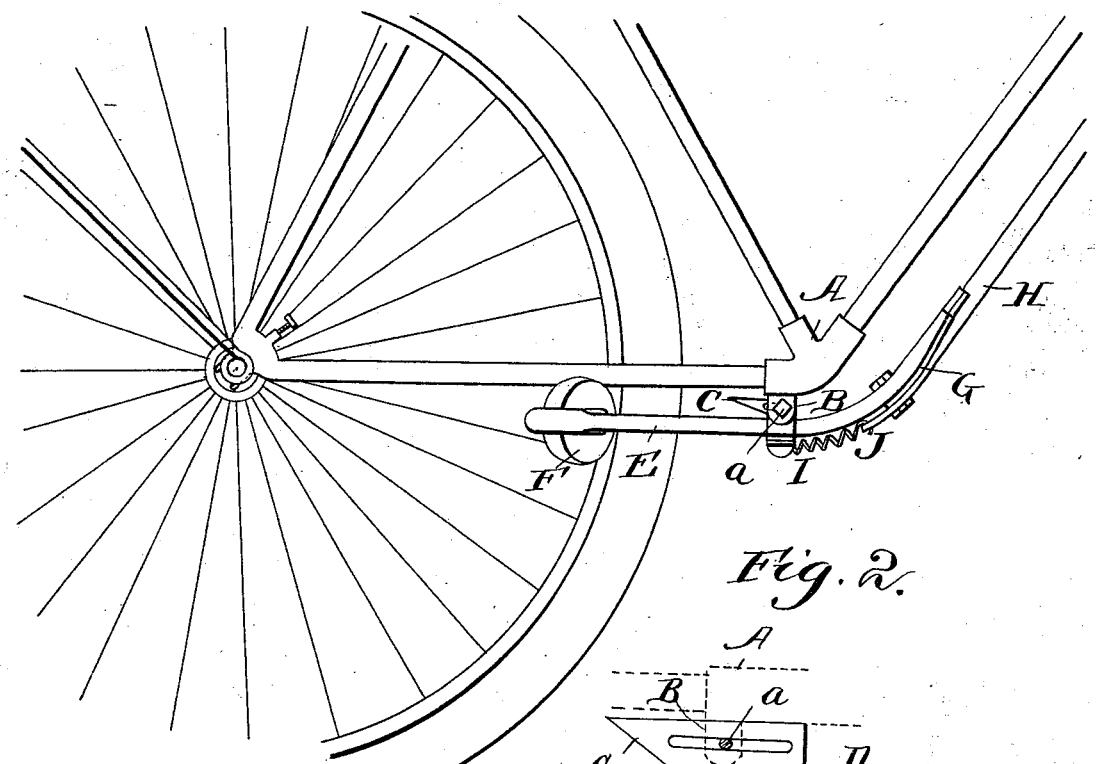
Figure 3:
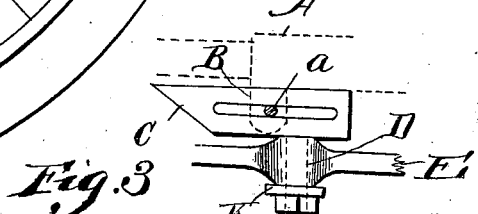

Figure 1, is a top view of the device, and Fig. 2, is a side view as applied to the rear wheel of a bicycle. Fig. 3 is an enlarged side view of a portion of the device.

In all of the views like parts are designated by the same letters of reference.

I will describe the device as applied to the rear wheel of what is known to the trade as a Century Columbia bicycle, (pattern 1892;) but I desire it understood that I do not limit myself in any way to this mode of application to a particular variety of bicycle for the reason that the device can be applied to any kind of bicycle, either to the front or rear wheel or to both wheels, or to any other vehicle, in many different ways without departing from the spirit of my invention.

A is the bottom bracket of the bicycle, with which are formed integrally two lugs, B, B, to which the brake is to be attached, and which are directly under the crank shaft. These same lugs B, B, are now used on this pattern of bicycle, for the attachment thereto of the spoon brakes, which are now applied to the rear or driving wheels thereof. Two brackets C, C, are to be bolted to these lugs, by means of bolts a, a. In the drawings I show these brackets provided with the slots therein for the fastening bolts a, a, so as to allow for the forward and backward adjustment of the brake whereby the brake will always retain its proper relative position with the wheel when the latter is moved for the tightening of the driving chain of the bicycle. These brackets C, C, bear up against the bottom bracket A, of the bicycle, and offer a firm and rigid support for the brake.

Two vertical screw lugs D, D, are formed integral with the brackets C, C, and upon these screw lugs are pivotally mounted the two arms or levers E, E, bent upward at their forward end to follow the frame of the bicycle, and spreading outward, back of the pivot point on the screw lugs D, D, to clear the tire and felly, and surround the same, and then upward at their extreme rear end, to be almost into engagement with the felly, on each side of the spokes. The rear extremities of these levers are provided with rubber cushions F, F, which are adapted to be clamped against the rim or felly of the wheel. I prefer to make use of the rubber cushions to prevent scratching or wear of the rim, to make the operation of the device as noiseless as possible, and to give a good gripping surface. These cushions are preferably spherical in shape and they may be so pivoted to the ends of the arms, E, E, that such cushions will revolve when pressing against the felly, which will allow for equal wear thereof, and will equalize the strain between the two arms. The said cushions F, F, may be of other shapes, and of other material and may be rigidly held normally in place, in such a way that when one part of each of said cushions is worn, it may be turned partly around to present a fresh surface.

To the opposite (i. e. the front), extremities of the two arms E, E, are pivoted two short links G, G, to which is also pivoted the operating rod H which connects in this case, with the brake lever pivoted to the handle of the bicycle, close to the hands of the operator. This rod and the links G, G, are normally retracted into the position shown in Fig. 1, (full lines) by means of the spring I secured to the extension J of the aforesaid rod H, and to a bridge piece K extending between the two bolts D, D, whereby and by means of which a well known form of toggle lever is obtained.

The operation of the device is substantially as follows: Power is applied to the brake lever, and the rod H will be moved forward, against the tension of the spring I, the arms E, E, separating at their forward ends and closing in on the fellies at their rear ends, by means of the short links G, G, so that the parts will assume the position shown in dotted lines (Fig. 1). This will cause the rubber cushions F, F, to press strongly against the rim or felly of the wheel which will cause friction enough to very effectively retard the rotation of the wheel.

My device can be applied to the front wheel of a bicycle without any change by simply bolting it to the front fork crown or in any other suitable way, or if desired a separate brake may be used for both wheels adapted to be simultaneously operated by a single set of levers.

When applying the device to velocipedes, tricycles or ordinary vehicles it will be understood that the only changes which will be necessary, will be with regard to the attachment of the brake thereto, its operation remaining unchanged, and its principle operative parts being made use of, in the manner I have described.

Having now described my invention, what I claim as new therein, and desire to secure by Letters Patent, is—

An improved brake for vehicles, consisting of the levers E, E, pivoted to the brackets C, having slots therein for attachment to the vehicle, and the extremities of the levers being adapted to grip the rim of the wheel, the opposite extremities being connected together by the links G, G, and the spring I, connecting the links G, G, and the bridge piece K, for retracting said links, substantially as described.

In testimony whereof I affix my signature in presence of two witnesses.

JAMES A. BICKFORD.

Witnesses:
  B. F. GEARY,
  W. F. SATTERLEE.